July 6, 1954     L. P. PAWLEY     2,682,828
TRANSPARENT KNOB FOR PERCOLATORS
Filed March 31, 1950
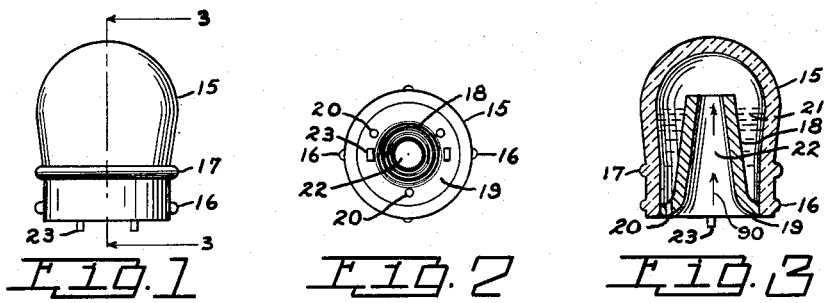
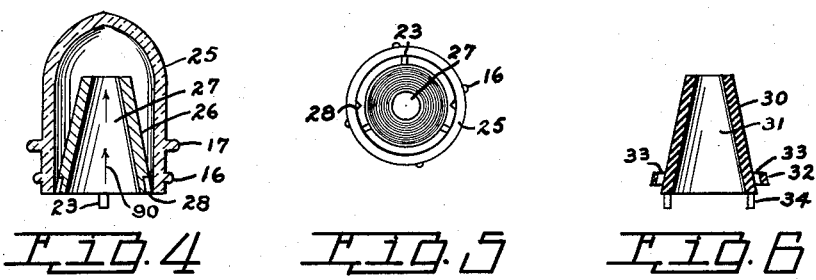
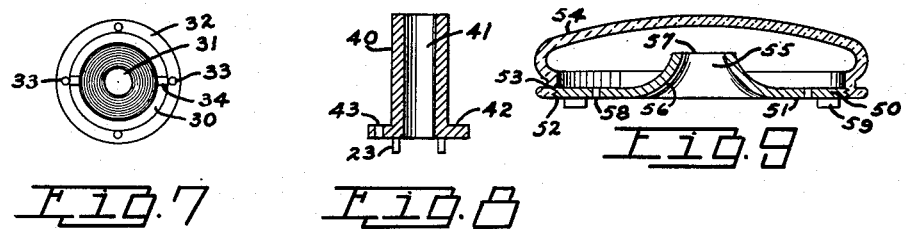
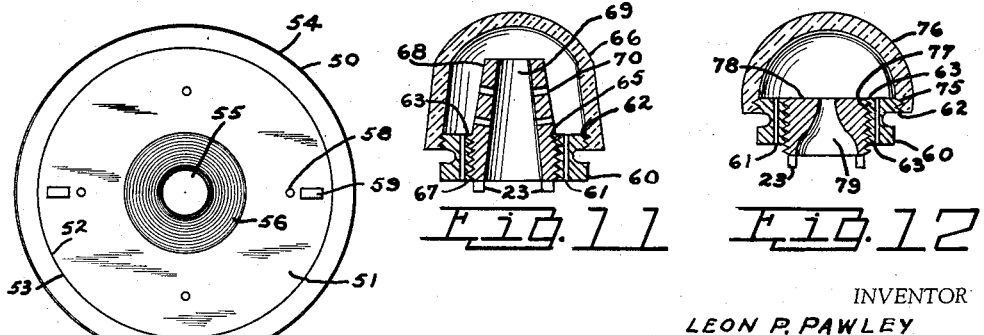
INVENTOR
LEON P. PAWLEY
BY *J. B. Dickman, Jr.*
ATTORNEY Patented July 6, 1954

2,682,828

UNITED STATES PATENT OFFICE 2,682,828

TRANSPARENT KNOB FOR PERCOLATORS

Leon P. Pawley, Wilmington, Del.

Application March 31, 1950, Serial No. 153,144

1 Claim. (Cl. 99—285)

The present invention relates to a device to be used in combination with a vessel or container of the percolator type in which is brewed coffee, tea or other liquids.

It is an object of the present invention to provide a transparent knob adapted for engagement with the lid of a vessel of the percolator type.

Another object of the present invention is the provision of a transparent knob having means associated therein that will allow the brew to pass into the knob and temporarily retain the brew in the knob in order that the color of the brew may be viewed.

A still further object of the present invention is the provision of a transparent knob for use with a percolator that may be made of glass, plastic, rubber or any other suitable material.

A still further object of the present invention is the provision of a device adapted for use with a knob of a percolator that may be wedged, screw threaded or gasketed therein.

A still further object of the present invention is the provision of means on the device for assisting in removal of the device from the knob.

A still further object of the present invention is the provision of a transparent device adapted for engagement with the lid of a percolator that may be of unitary structure.

In order to make the invention more clearly understood there are shown in the accompanying drawing means for carrying the same into practical effect, without limiting the improvements, in their useful applications, to the particular construction which, for the purpose of explanation, have been made the subject of illustration.

In the drawing—

Figure 1 is an elevational view of a glass knob used with a percolator type of vessel.

Figure 2 is a bottom plan view of Figure 1.

Figure 3 is a sectional view taken on line 3—3 of Figure 1, illustrating the device positioned in a glass knob.

Figure 4 is a sectional view of a different type of glass knob and showing the present device provided with V-shaped drain channels.

Figure 5 is a bottom plan view of Figure 4.

Figure 6 is a sectional view of the present device made of rubber and having a flange or gasket that is provided with drain apertures.

Figure 7 is a bottom plan view of Figure 6.

Figure 8 is a modified form of the device.

Figure 9 is another modified form of the device and showing screw threads.

Figure 10 is a bottom plan view of Figure 9.

Figure 11 is another modified form of the invention, and

Figure 12 is a further modified form of the device.

Similar reference characters refer to similar parts throughout the drawing.

Referring to the drawing, and as illustrated in Figures 1 to 3, the numeral 15 represents a glass knob usually associated with the lid of a vessel of the percolator type, the glass knob being secured in a lid (not shown) by projections 16, the flange 17 engaging the top surface of a lid. Within the glass knob there is positioned a substantially cone-shaped element 18 having its base 19 flared, the base being provided with vertical drain apertures 20, that serve as outlets for a liquid within the knob 15 and represented by dotted lines 21. The substantially coned shaped element 18 has a through bore 22 that permits the entrance of liquid into the glass knob 15 during a brewing operation. The base 19 is provided with integrally formed depending lugs 23 that serve as an engagement means for fingers or other suitable means for removing the element 18 from the glass knob 15 after the brewing operation.

In Figures 4 and 5 the numeral 25 represents a glass knob of different configuration than the glass knob 15, and within the glass knob 25 there is positioned a coned shaped element 26 having a through bore 27 that admits liquid into the glass knob 25. In the wall of the coned shaped element 26 and extending upwardly therefrom there is provided V-shaped channels 28 that permit liquid in the glass knob 25 to drain therefrom.

In the form of the invention shown in Figures 6 and 7, the cone-shaped element 30 is made of rubber, aluminum or other suitable material and it has a through bore 31 and a flange or gasket 32. The gasket is provided with a plurality of drain apertures 33, and depending from the base of the element 30 are integrally formed lugs 34.

Figure 8 shows a modified form of the element to be associated with a glass knob and it comprises a cylindrical body 40 having a through bore 41 and a flanged base 42, the base being provided with a plurality of drain apertures 43 and depending lugs 23.

In the form of the invention shown in Figures 9 and 10, the element 50 is a modified form and it comprises a base 51, the peripheral edge of which is provided with threads 52 that engage threads 53 in the side wall of the glass head 54. The element 50 has a through bore 55, the walls 56 of which are curved to the outlet opening 57. The base 51 is provided with vertical drain apertures 58 and depending lugs 59, the drain apertures allowing liquid to drain from the element 50.

In the modified forms of the invention shown in Figures 11 and 12 a bushing 60 is provided for engagement with glass knobs of different types, the bushings being provided with drain bores 61. The peripheral edge of the bushing is provided with threads 62 and the inner peripheral wall of the bushings are provided with threads 63. In Figure 11, the threads 62 engage threads 65 of the glass knob 66, while threads 63 engage threads 67 on element 68. The element 68 has a through bore 69, angularly disposed drain bores 70 and lugs 23.

In Figure 12 the threads 62 of the bushing 60 engage threads 75 of the glass knob 76, while the threads 63 receive threads 77 of element 78. Element 78 is provided with a through bore 79 and it is to be noted that this bore is of bell shape configuration, the base of element 78 being provided with the depending lugs 23.

In the use of the elements 18 and 26, the elements are inserted into the glass knobs 15 and 25 until the base of each of the elements 18 and 26 are in alignment with the respective bases of the glass knobs 15 and 25. As a liquid is brewed it will pass up through the bores 22 and 27 as shown by the arrows 90 into the glass knobs 15 and 25. As the liquid continues to be brewed, as an example coffee, the color of the liquid will change and the change can be viewed by the maker. During the brewing and while the liquid due to the heat pressure built up in the percolator, passes into the glass knobs 15 and 25 a certain level of the liquid in the glass knobs will be maintained due to the restricted size of the drain apertures 20 and 28.

In using the element 30 the element is forced into a glass knob, the flange or gasket 32 engaging the inner wall of the knob, thus securing the element 30 in fixed position.

In using the element 50, it is simply screwed into the glass knob 54, the lugs 59 serving as the elements to be engaged when disconnecting the element 51 from the glass knob 54.

In Figures 11 and 12 the bushing is first screwed into the glass knobs 66 and 76. The elements 68 and 78 are then screwed into the bushings 60, removal of the elements 68 and 78 being effected by engagement with the lugs 23.

In view of the fact that elements 30, 40, 50, 68 and 78 operate as the elements 18 and 26 no further description of these elements is believed necessary.

I am aware that changes may be made and numerous details of construction varied without departing from the principles of this invention, and I therefore do not wish to limit to the exact showing, it being obvious that changes may be made without departing from the spirit of the invention.

What is claimed is:

In a coffee making device of the type in which the water is elevated to a percolator basket through a fountain tube, the combination of a lid with a transparent indicator, an insert in said indicator having means thereon to engage said indicator, means in said insert to allow passage of coffee from said fountain tube, means to entrap a portion of said coffee, and restricted vents in said insert to drain said coffee back to said percolator basket.

References Cited in the file of this patent

UNITED STATES PATENTS

| Number | Name | Date |
| --- | --- | --- |
| 123,258 | Goodrich | Jan. 30, 1872 |
| 666,593 | Babin | Jan. 22, 1901 |
| 690,310 | McBride | Dec. 31, 1901 |
| 772,498 | Chapman et al. | Oct. 18, 1904 |
| 851,417 | Heinrichs | Apr. 23, 1907 |
| 860,272 | Warner | July 16, 1907 |
| 1,056,049 | Nelson | Mar. 18, 1913 |
| 1,202,977 | Drake | Oct. 31, 1916 |
| 1,486,943 | Bates | Mar. 18, 1924 |
| 1,717,963 | Denny | June 18, 1929 |
| 1,756,491 | Marsh | Apr. 29, 1930 |
| 1,976,658 | Deuring | Oct. 9, 1934 |
| 2,181,251 | Tufts | Nov. 28, 1939 |
| 2,186,987 | Nesset | Jan. 16, 1940 |